United States Patent [19]

Kusakabe et al.

[11] Patent Number: 5,018,301

[45] Date of Patent: May 28, 1991

[54] METHOD OF CULTIVATING MUSHROOMS

[75] Inventors: Katsuhiko Kusakabe, Otsu; Hitoshi Maruyama, Shiga; Yukita Kawano, Otsu; Susumu Matsui, Otsu; Tsutomu Taniguchi, Kyoto; Akira Obayashi, Uji, all of Japan

[73] Assignee: Takara Shuzo Co., Ltd., Kyoto, Japan

[21] Appl. No.: 343,547

[22] Filed: Apr. 21, 1989

[30] Foreign Application Priority Data

Jun. 14, 1988 [JP] Japan ............................ 63-144693
Oct. 25, 1988 [JP] Japan ............................ 63-267237

[51] Int. Cl.$^5$ .............................................. A01G 1/04

[52] U.S. Cl. .................................................... 47/1.1
[58] Field of Search ........................... 47/1.1; 435/911

[56] References Cited

U.S. PATENT DOCUMENTS

Re. 22,202 10/1942 Stoller ..................................... 47/1.1
4,537,613  8/1985 Pebeyre ................................... 47/1.1

Primary Examiner—James R. Feyrer
Attorney, Agent, or Firm—Wenderoth, Lind & Ponack

[57] ABSTRACT

Method of cultivating mushrooms in a culture medium containing aluminum or a particular aluminum compound.

1 Claim, No Drawings

METHOD OF CULTIVATING MUSHROOMS

This invention relates to a method of cultivating mushrooms in an improved culture medium.

Mushrooms have hitherto been produced mainly by the bed-log cultivation method using logs of *Quercus serrata* (a species of oak), *Quercus acutissima* (a species of oak), *Fagus crenata* (Japanese beech) or the like as the bed material. This method includes many problems. The harvest is frequently influenced by weather; bed logs are not readily available in recent years because of the shortage of material wood and the manpower for lumbering the same; and the cultivation period is long (requiring 1.5 to 2 years for harvesting after inoculation), resulting in considerably high production costs.

Recently, a sawdust-medium cultivation method has been established for *Flammulina velutipes, Pleurotus ostreatus, Lyophyllum ulmarium* and *Pholiota nameko,* in which the mushrooms are cultivated in a bottle or box filled with a sawdust culture medium containing rice bran. This method ensures a constant harvest at all seasons throughout the year. As a result, mushroom cultivation which was of a small-scale production type and tended to be conducted as a side business by farmers is now being shifted to the sawdust-medium cultivation system which employs readily available materials and can be conducted on an industrial scale by enterprises.

However, this new sawdust-medium cultivation method also has the problem that the production cost is still high because of the low product yield and long cultivation period required in continuous, large-scale production. Hence, there has been a demand for enhanced productivity.

The object of this invention is to provide a method of cultivating mushrooms with a higher yield.

In brief, this invention relates to a method of cultivating mushrooms in a culture medium which contains aluminum and/or an aluminum compound.

In order to solve the problems associated with the conventional method, we made extensive studies on the effect of various aluminum compounds added to the sawdust medium. As a result, it was found that aluminosilicates and aluminates (e.g., magnesium aluminometasilicate, magnesium aluminate, sodium aluminosilicate, sodium aluminate, calcium aluminosilicate and barium aluminosilicate), water-soluble aluminum salts (e.g., aluminum chloride and ammonium aluminum sulfate), insoluble aluminum salts such as aluminum silicates and aluminum salts of fatty acids (e.g., aluminum stearate and aluminum laurate), aluminum oxides and hydroxides (e.g., activated alumina and aluminum hydroxide gel), synthetic hydrotalcites, and many other aluminum compounds have the effect of improving the yield of mushrooms. In addition, it was also demonstrated that addition of aluminum powder to the sawdust medium is also effective in improving the product yield. We thus concluded that the aluminum atom itself has such a desirable effect, and accomplished this invention.

Aluminum is an element widely found on the earth—the most abundant metal element in the earth's crust. It exists in the form of various metal aluminosilicates in rocks and soil as an important component thereof. Bauxite and kaolin are typical examples of ores containing this element. Aluminum is produced on an industrial scale by molten salt electrolysis of cryolyte or alumina (HéroultHall's method). It is a light-weight, soft metal of silver-gray color showing high ductility and malleability and resistant to corrosion, and is therefore used, as metal or alloys, in a variety of fields (construction and transportation materials, chemical apparatuses, household necessaries, thermite, paint, power cables, etc.). Its compounds are primarily produced from aluminum hydroxide, and are also employed in diversified fields (catalysts, dyeing agents, medicines, metal soaps, adsorbents, Portland cement, earthenware, material for glass, fluidity promoters, thickening agents, etc.). Many of these aluminum compounds are used as industrial materials and are hence available at relatively low costs.

The present invention is described below in more detail.

The culture medium used in this invention may be prepared by adding a proper amount of water to a mixture of carbon source (such as sawdust, wheat bran and chaff) and nitrogen source (such as rice bran and soybean meal), and pressing the resulting mixture into a bottle or a box. When sawdust is used as the carbon source, its amount may be in the range from 20 to 90% based on the weight of total culture medium on a dry basis, and the suitable amount varies with the type of nitrogen source used in combination. When rice bran is used as nitrogen source, for example, it is preferable to mix equal weights of sawdust and rice bran together, to add water to the resulting mixture in such an amount that the final water content will be in the range of 60 to 65%, and to press the culture medium thus obtained into a wide-mouthed bottle.

Sawdust of a broad-leaved tree or that of a coniferous tree may be used either alone or in combination.

The suitable mixing ratio of aluminum and/or an aluminum compound to sawdust greatly varies depending on the type of the former component, and the effect of increasing the mushroom yield is highly dependent on this mixing ratio. When magnesium aluminometasilicate is used, for example, the weight ratio is preferably $1 \sim 20:100$, most preferably $7 \sim 13:100$. The preferable mixing ratio and the most preferable ratio are $1 \sim 20:100$ and $5 \sim 10:100$ with magnesium aluminate, $1 \sim 20:100$ and $5 \sim 12:100$ with sodium aluminosilicate, $0.2 \sim 6.0:100$ and $1.0 \sim 3.0:100$ with sodium aluminate (40% aqueous solution), $1 \sim 20:100$ and $7 \sim 15:100$ with calcium aluminosilicate, $1 \sim 20:100$ and $7 \sim 20:100$ with barium aluminosilicate, $4.8 \times 10^{-3} \sim 3.0:100$ and $4.8 \times 10^{-2} \sim 1.0:100$ with aluminum chloride hexahydrate), $9.1 \times 10^{-3} \sim 5.6:100$ and $9.1 \times 10^{-3} \sim 1.9:100$ with ammonium aluminum sulfate (dodecahydrate), $3.6 - 21.5:100$ and $7.2 \sim 14.3:100$ with aluminum monostearate, $3.3 \sim 13.0:100$ and $6.5 \sim 13.0:100$ with aluminum laurate, $0.56 \sim 25:100$ and $5.8 \sim 17.5:100$ with aluminum trisilicate, $4.0 \sim 25:100$ and $18 \sim 25:100$ with aluminum nonasilicate, $1 \sim 13:100$ and $3 \sim 7:100$ with synthetic hydrotalcite, and $0.1 \sim 10.0:100$ and $0.8 \sim 3.0:100$ with aluminum powder.

However, the amounts of these compounds to be added are not limited by the above-mentioned values. In addition, aluminum or any of the aluminum compounds may be used either alone or in combination.

Mushrooms to which the method of this invention can be applied are those which can be cultivated, for example, *Flammulina velutipes, Pleurotus ostreatus, Lyophyllum ulmarium* and *Pholiota nameko.*

The following examples will further illustrate the invention but are not intended to limit its scope.

EXAMPLE 1

To an intimate mixture of 50 g broad-leaved tree's sawdust (*Fagus crenata*), 50 g coniferous tree's sawdust (*Cryptomeria japonica*, Japanese cedar) and 100 g rice bran, was added 0, 1, 3, 5, 7, 10, 13, 15 or 20 g of magnesium aluminometasilicate (Neusilin ®; product of Fuji Chemical Industry Co., Ltd.), and water was further added in such an amount that the final water content will be 63%. Each of the culture media thus obtained was pressed into a wide-mouthed, plastic bottle (850 ml), a hole about 1 cm in diameter was bored at the center of the pressed medium, and the bottle was stoppered with a cap and autoclaved at 120° C. for 90 minutes. After cooling, spawn of *Lyophyllum ulmarium* was inoculated in the usual way and cultivated in the dark at 25° C. and 55% R.H. for 30 days (the step of allowing mycelium to cover the surface of the sawdust medium), and cultivation was further continued for an additional 55 days. After removing the cap, the culture medium was turned up to a depth of about 1 cm to comb out its surface layer with mycelium (a process to promote the formation of fruiting bodies), and the remaining medium was sprinkled with 20 ml tap water. After standing for four hours, the water left unabsorbed on the surface of the medium was removed, cultivation was continued at a temperature of 15° C., a relative humidity of 95% and a luminous intensity of 20 lux for ten days to form primordia of fruiting bodies. The luminous intensity was then raised to a level of 200 lux, and cultivation was further continued for 15 days, thereby examining the effect of magnesium aluminometasilicate upon the yield of fruiting bodies. The result obtained is summarized in Table 1.

TABLE 1

| Amt. of M aluminometasilicate added (g) | Yield of fruiting bodies (g) | Rate of increase in Yield (%) |
|---|---|---|
| 0 | 109 | 100 |
| 1 | 115 | 106 |
| 3 | 132 | 121 |
| 5 | 158 | 145 |
| 7 | 174 | 160 |
| 10 | 174 | 160 |
| 13 | 169 | 155 |
| 15 | 159 | 146 |
| 20 | 150 | 138 |

As can be seen from the above table, addition of magnesium aluminometasilicate to the culture medium drastically increased the yield of *Lyophyllum ulmarium*.

EXAMPLE 2

To an intimate mixture of 50 g broad-leaved tree's sawdust (*Fagus crenata*), 50 g coniferous tree's sawdust (*Cryptomeria japonica*) and 100 g rice bran, was added 0, 1, 3, 5, 7, 10, 13, 15 or 20 g of magnesium aluminate (Sanalmin ®; product of Kyowa Chemical Industry Co., Ltd.), and water was further added in such an amount that the final water content will be 63%. Each of the culture media thus obtained was pressed into a wide-mouthed, plastic bottle (850 ml), a hole about 1 cm in diameter was bored at the center of the pressed medium, and the bottle was stoppered with a cap and autoclaved at 120° C. for 90 minutes. After cooling, spawn of *Lyophyllum ulmarium* was inoculated in the usual way and cultivated in the dark at 25° C. and 55% R.H. for 30 days (the step of allowing mycelium to cover the surface of the sawdust medium), and cultivation was further continued for an additional 55 days. After removing the cap, the culture medium was turned up to a depth of about 1 cm to comb out its surface layer with mycelium (a process to promote the formation of fruiting bodies), and the remaining medium was sprinkled with 20 ml tap water. After standing for four hours, the water left unabsorbed on the surface of the medium was removed, cultivation was continued at a temperature of 15° C., a relative humidity of 95% and a luminous intensity of 20 lux for ten days to form primordia of fruiting bodies. The luminous intensity was then raised to a level of 200 lux, and cultivation was further continued for 15 days, thereby examining the effect of magnesium aluminate upon the yield of fruiting bodies. The result obtained is summarized in Table 2.

TABLE 2

| Amt. of manesium aluminate added (g) | Yield of fruiting bodies (g) | Rate of increase in yield (%) |
|---|---|---|
| 0 | 101 | 100 |
| 1 | 106 | 105 |
| 3 | 139 | 138 |
| 5 | 148 | 147 |
| 7 | 157 | 155 |
| 10 | 160 | 158 |
| 13 | 142 | 141 |
| 15 | 138 | 137 |
| 20 | 135 | 134 |

As can be seen from the above table, addition of magnesium aluminate to the culture medium drastically increased the yield of *Lyophyllum ulmarium*.

EXAMPLE 3

To an intimate mixture of 50 g broad-leaved tree's sawdust (*Fagus crenata*), 50 g coniferous tree's sawdust (*Cryptomeria japonica*) and 100 g rice bran, was added 0, 1, 3, 5, 7, 10, 13, 15 or 20 g of magnesium aluminometasilicate (Neusilin ®; product of Fuji Chemical Industry Co., Ltd.), and water was further added in such an amount that the final water content will be 63%. Each of the culture media thus obtained was pressed into a wide-mouthed, plastic bottle (850 ml), a hole about 1 cm in diameter was bored at the center of the pressed medium, and the bottle was stoppered with a cap and autoclaved at 120° C. for 90 minutes.

After cooling, spawn of *Pleurotus ostreatus* was inoculated in the usual way and cultivated in the dark at 25° C. and 55% R.H. for 30 days. After removing the cap, the culture medium was turned up to a depth of about 1 cm to comb out its surface layer with mycelium (a process to promote the formation of fruiting bodies), and the remaining medium was sprinkled with 20 ml tap water. After standing for four hours, the water left unabsorbed on the surface of the medium was removed, cultivation was continued at a temperature of 15° C., a relative humidity of 95% and a luminous intensity of 20 lux for four days to form primordia of fruiting bodies. The luminous intensity was then raised to a level of 200 lux, and cultivation was further continued for an additional ten days, thereby examining the effect of magnesium aluminometasilicate upon the yield of fruiting bodies. The result obtained is summarized in Table 3.

TABLE 3

| Amt. of Mg aluminometasilicate added (g) | Yield of fruiting bodies (g) | Rate of increase in yield (%) |
|---|---|---|
| 0 | 91 | 100 |
| 1 | 94 | 103 |

TABLE 3-continued

| Amt. of Mg alumino-metasilicate added (g) | Yield of fruiting bodies (g) | Rate of increase in yield (%) |
| --- | --- | --- |
| 3 | 101 | 111 |
| 5 | 109 | 120 |
| 7 | 120 | 132 |
| 10 | 127 | 140 |
| 13 | 126 | 138 |
| 15 | 110 | 121 |
| 20 | 101 | 111 |

As can be seen from the above table, addition of magnesium aluminometasilicate to the culture medium drastically increased the yield of *Pleurotus ostreatus*.

EXAMPLE 4

To an intimate mixture of 50 g broad-leaved tree's sawdust (*Fagus crenata*), 50 g coniferous tree's sawdust (*Cryptomeria japonica*) and 100 g rice bran, was added 0, 1, 3, 5, 7, 9, 12, 15, 18 or 20 g of sodium aluminosilicate (synthetic zeolite; product of Japan Builder Co., Ltd.), and water was further added in such an amount that the final water content will be 63%. Each of the culture media thus obtained was pressed into a wide-mouthed, plastic bottle (850 ml), a hole about 1 cm in diameter was bored at the center of the pressed medium, and the bottle was stoppered with a cap and autoclaved at 120° C. for 90 minutes. After cooling, spawn of *Lyophyllum ulmarium* (M-8171 strain, deposited at Fermentation Research Institute, Agency of Industrial Science and Technology, under the deposit number of FERM BP-1415) was inoculated in the usual way and cultivated in the dark at 25° C. and 55% R.H. for 30 days (the step of allowing mycelium to cover the surface of the sawdust medium), and cultivation was further continued for an additional 30 days. After removing the cap, the culture medium was turned up to a depth of about 1 cm to comb out its surface layer with mycelium (a process to promote the formation of fruiting bodies), and the remaining medium was sprinkled with 20 ml tap water. After standing for four hours, the water left unabsorbed on the surface of the medium was removed, cultivation was continued at a temperature of 15° C., a relative humidity of 95% and a luminous intensity of 20 lux for ten days to form primordia of fruiting bodies. The luminous intensity was then raised to a level of 200 lux, and cultivation was continued for 15 days, thereby examining the effect of sodium aluminosilicate upon the yield of fruiting bodies. The result obtained is summarized in Table 4.

TABLE 4

| Amt. of Na aluminosilicate added (g) | Yield of fruiting bodies (g) | Rate of increase in yield (%) |
| --- | --- | --- |
| 0 | 116 | 100 |
| 1 | 121 | 104 |
| 3 | 157 | 135 |
| 5 | 171 | 147 |
| 7 | 167 | 144 |
| 9 | 165 | 142 |
| 12 | 140 | 121 |
| 15 | 128 | 110 |
| 18 | 123 | 106 |
| 20 | 119 | 103 |

As can be seen from the above table, addition of sodium aluminosilicate to the culture medium drastically increased the yield of *Lyophyllum ulmarium* (M-8171 strain, FERM BP-1415).

EXAMPLE 5

To an intimate mixture of 50 g broad-leaved tree's sawdust (*Fagus crenata*), 50 g coniferous tree's sawdust (*Cryptomeria japonica*) and 100 g rice bran, was added 0, 0.2, 0.5, 1.0, 1.5, 2.0, 3.0, 4.0, 5.0 or 6.0 g of sodium aluminate (product of Osaka Soda Co., Ltd.; 40% aqueous solution), and water was further added in such an amount that the final water content will be 63%. Each of the culture media thus obtained was pressed into a wide-mouthed, plastic bottle (850 ml), a hole about 1 cm in diameter was bored at the center of the pressed medium, and the bottle was stoppered with a cap and autoclaved at 120° C. for 90 minutes. After cooling, spawn of *Lyophyllum ulmarium* (M-8171 strain, FERM BP-1415) was inoculated in the usual way and cultivated in the dark at 25° C. and 55% R.H. for 30 days (the step of allowing mycelium to cover the surface of the sawdust medium), and cultivation was further continued for an additional 30 days. After removing the cap, the culture medium was turned up to a depth of about 1 cm to comb out its surface layer with mycelium (a process to promote the formation of fruiting bodies), and the remaining medium was sprinkled with 20 ml tap water. After standing for four hours, the water left unabsorbed on the surface of the medium was removed, cultivation was continued at a temperature of 15° C., a relative humidity of 95% and a luminous intensity of 20 lux for ten days to form primordia of fruiting bodies. The luminous intensity was then raised to a level of 200 lux, and cultivation was continued for 15 days, thereby examining the effect of sodium aluminate upon the yield of fruiting bodies. The result obtained is summarized in Table 5.

TABLE 5

| Amt. of sodium aluminate added (g) | Yield of fruiting bodies (g) | Rate of increase in yield (%) |
| --- | --- | --- |
| 0 | 105 | 100 |
| 0.2 | 112 | 107 |
| 0.5 | 129 | 123 |
| 1.0 | 168 | 160 |
| 1.5 | 166 | 158 |
| 2.0 | 160 | 152 |
| 3.0 | 150 | 143 |
| 4.0 | 139 | 132 |
| 5.0 | 126 | 120 |
| 6.0 | 125 | 119 |

As can be seen from the above table, addition of sodium aluminate to the culture medium drastically increased the yield of *Lyophyllum ulmarium* (M-817) strain, FERM BP-1415).

EXAMPLE 6

To an intimate mixture of 50 g broad-leaved tree's sawdust (*Fagus crenata*), 50 g coniferous tree's sawdust (*Cryptomeria japonica*) and 100 g rice bran, was added 0, 0.2, 0.5, 1.0, 1.5, 2.0, 3.0, 4.0, 5.0 or 6.0 g of sodium aluminate (product of Osaka Soda Co., Ltd.; 40% aqueous solution), and water was further added in such an amount that the final water content will be 63%. Each of the culture media thus obtained was pressed into a wide-mouthed, plastic bottle (850 ml), a hole about 1 cm in diameter was bored at the center of the pressed medium, and the bottle was stoppered with a cap and autoclaved at 120° C. for 90 minutes. After cooling, spawn of *Lyophyllum ulmarium* (1-2 strain) was inoculated in the usual way and cultivated in the dark at 25° C. and 55% R.H. for 30 days (the step of allowing mycelium to cover the surface of the sawdust medium), and cultivation was further continued for an additional 55 days. After removing the cap, the culture medium was turned up to a depth of about 1 cm to comb out its surface layer with mycelium (a process to promote the formation of fruiting bodies), and the remaining medium was sprinkled with 20 ml tap water. After standing for four hours, the water left unabsorbed on the surface of the medium was removed, cultivation was continued at a temperature of 15° C., a relative humidity of 95% and a luminous intensity of 20 lux for ten days to form primordia of fruiting bodies. The luminous intensity was then raised to a level of 200 lux, and cultivation was continued for 15 days, thereby examining the effect of sodium aluminate upon the yield of fruiting bodies. The result obtained is summarized in Table 6.

TABLE 6

| Amt. of sodium aluminate added (g) | Yield of fruiting bodies (g) | Rate of increase in yield (%) |
| --- | --- | --- |
| 0 | 113 | 100 |
| 0.2 | 118 | 104 |
| 0.5 | 132 | 117 |
| 1.0 | 169 | 150 |
| 1.5 | 170 | 150 |
| 2.0 | 163 | 144 |
| 3.0 | 155 | 137 |
| 4.0 | 138 | 122 |
| 5.0 | 130 | 115 |
| 6.0 | 128 | 113 |

As can be seen from the above table, addition of sodium aluminate to the culture medium drastically increased the yield of *Lyophyllum ulmarium* (1-2 strain).

EXAMPLE 7

To an intimate mixture of 50 g broad-leaved tree's sawdust (*Fagus crenata*), 50 g coniferous tree's sawdust (*Cryptomeria japonica*) and 100 g rice bran, was added 0, 1, 3, 5, 7, 10, 15 or 20 g of calcium aluminosilicate or barium aluminosilicate (Ca-A type zeolite, Ba-A type zeolite; products of Japan Builder Co., Ltd.), and water was further added in such an amount that the final water content will be 63%. Each of the culture media thus obtained was pressed into a wide-mouthed, plastic bottle (850 ml), a hole about 1 cm in diameter was bored at the center of the pressed medium, and the bottle was stoppered with a cap and autoclaved at 120° C. for 90 minutes. After cooling, spawn of *Lyophyllum ulmarium* (M-8171 strain, FERM BP-1415) was inoculated in the usual way ahd cultivated in the dark at 25 C. and 55% R.H. for 30 days (the step of allowing mycelium to cover the surface of the sawdust medium), and cultivation was further continued for an additional 30 days. After removing the cap, the culture medium was turned up to a depth of about 1 cm to comb out its surface layer with mycelium (a process to promote the formation of fruiting bodies), and the remaining medium was sprinkled with 20 ml tap water. After standing for four hours, the water left unabsorbed on the surface of the medium was removed, cultivation was continued at a temperature of 15° C., a relative humidity of 95% and a luminous intensity of 20 lux for ten days to form primordia of fruiting bodies. The luminous intensity was then raised to a level of 200 lux, and cultivation was continued for 15 days, thereby examining the effects of calcium and barium aluminosilicates upon the yield of fruiting bodies. The result obtained is summarized in Table 7.

TABLE 7

| Type of compound added | Amount added (g) | Yield of fruiting bodies (g) | Rate of increase in yield (%) |
| --- | --- | --- | --- |
| Ca aluminosilicate | 0 | 119 | 100 |
| | 1 | 135 | 113 |
| | 3 | 142 | 119 |
| | 5 | 148 | 124 |
| | 7 | 168 | 141 |
| | 10 | 175 | 147 |
| | 15 | 179 | 150 |
| | 20 | 158 | 133 |
| Ba aluminosilicate | 1 | 124 | 104 |
| | 3 | 127 | 107 |
| | 5 | 139 | 117 |
| | 7 | 157 | 132 |
| | 10 | 165 | 139 |
| | 15 | 170 | 143 |
| | 20 | 163 | 137 |

As can be seen from the above table, addition of calcium or barium aluminosilicate to the culture medium drastically increased the yield of *Lyophyllum ulmarium* (M-8171 strain, FERM BP-1415)

EXAMPLE 8

To an intimate mixture of 50 g broad-leaved tree's sawdust (*Fagus crenata*), 50 g coniferous tree's sawdust (*Cryptomeria japonica*) and 100 g rice bran, was added 0, $4.8 \times 10^{-3}$, $4.8 \times 10^{-2}$, 0.48, 1.0 or 3.0 g of aluminum chloride hexahydrate (Guaranteed reagent; Nakarai Chemicals Co., Ltd.), or $9.1 \times 10^{-3}$, $9.1 \times 10^{-2}$, 0.91, 1.9 or 5.6 g of ammonium aluminum sulfate dodecahydrate (Guaranteed reagent; Nakarai Chemicals Co., Ltd.), and water was further added in such an amount that the final water content will be 63%. Each of the culture media thus obtained was pressed into a wide-mouthed, plastic bottle (850 ml), a hole about 1 cm in diameter was bored at the center of the pressed medium, and the bottle was stoppered with a cap and autoclaved at 120° C. for 90 minutes. After cooling, spawn of *Lyophyllum ulmarium* (M-8171 strain, FERM BP-1415) was inoculated in the usual way and cultivated in the dark at 25° C. and 55% R.H. for 30 days (the step of allowing mycelium to cover the surface of the sawdust medium), and cultivation was further continued for an additional 30 days. After removing the cap, the culture medium was turned up to a depth of about 1 cm to comb out its surface layer with mycelium (a process to promote the formation of fruiting bodies), and the remaining medium was sprinkled with 20 ml tap water. After standing for four hours, the water left unabsorbed on the surface of the medium was removed, cultivation was continued at a temperature of 15° C., a relative humidity of 95% and a luminous intensity of 20 lux for ten days to form primordia of fruiting bodies. The luminous intensity was then raised to a level of 200 lux, and cultivation was continued for 15 days, thereby examining the effects of aluminum chloride and ammonium aluminum sulfate upon the yield of fruiting bodies. The result obtained is summarized in Table 8.

TABLE 8

| Type of compound added | Amount added (g) | Yield of fruiting bodies (g) | Rate of increase in yield (%) |
| --- | --- | --- | --- |
| Aluminum chloride | 0 | 126 | 100 |
| | $4.8 \times 10^{-3}$ | 136 | 108 |
| | $4.8 \times 10^{-2}$ | 142 | 113 |
| | 0.48 | 158 | 125 |

TABLE 8-continued

| Type of compound added | Amount added (g) | Yield of fruiting bodies (g) | Rate of increase in yield (%) |
| --- | --- | --- | --- |
| | 1.0 | 150 | 119 |
| | 3.0 | 142 | 113 |
| Ammonium aluminum sulfate | $9.1 \times 10^{-3}$ | 169 | 134 |
| | $9.1 \times 10^{-2}$ | 170 | 135 |
| | 0.91 | 165 | 131 |
| | 1.9 | 155 | 123 |
| | 5.6 | 145 | 115 |

As can be seen from the above table, addition of aluminum chloride or ammonium aluminum sulfate to the culture medium drastically increased the yield of *Lyophyllum ulmarium* (M-8171 strain, FERM BP-1415).

EXAMPLE 9

To an intimate mixture of 50 g broad-leaved tree's sawdust (*Fagus crenate*), 50 g coniferous tree's sawdust (*Cryptomeria japonica*) and 100 g rice bran, was added 0, 3.6, 7.2, 14.3 or 21.5 g of aluminum monostearate (Nakarai Chemicals Co., Ltd.), or 3.3, 6.5 or 13.0 g of aluminum laurate (Extra pure reagent; Kanto Chemical Co., Ltd.), water was further added in such an amount that the final water content will be 63%, and each of the culture media thus obtained was pressed into a wide-mouthed, plastic bottle (850 ml). Separately, culture media containing 2.9, 5.9, 11.8 and 17.7 g of stearic acid (SA-420; Asahi Denka Kogyo Co., Ltd.) were prepared as the control group. A hole about 1 cm in diameter was bored at the center of each pressed medium, and the bottle was stoppered with a cap and autoclaved at 120° C. for 90 minutes. After cooling, spawn of *Lyophyllum ulmarium* (M-8171 strain, FERM BP-1415 ) was inoculated in the usual way and cultivated in the dark at 25° C. and 55% R.H. for 30 days (the step of allowing mycelium to cover the surface of the sawdust medium), and cultivation was further continued for an additional 30 days. After removing the cap, the culture medium was turned up to a depth of about 1 cm to comb out its surface layer with mycelium (a process to promote the formation of fruiting bodies), and the remaining medium was sprinkled with 20 ml tap water. After standing for four hours, the water left unabsorbed on the surface of the medium was removed, cultivation was continued at a temperature of 15° C., a relative humidity of 95% and a luminous intensity of 20 lux for ten days to form primordia of fruiting bodies. The luminous intensity was then raised to a level of 200 lux, and cultivation was continued for 15 days, thereby examining the effects of aluminum monostearate, aluminum laurate and stearic acid upon the yield of fruiting bodies. The result obtained is summarized in Table 9.

TABLE 9

| Type of compound added | Amount added (g) | Yield of fruiting bodies (g) | Rate of increase in yield (%) |
| --- | --- | --- | --- |
| Aluminum monostearate | 0 | 133 | 100 |
| | 3.6 | 158 | 119 |
| | 7.2 | 171 | 129 |
| | 14.3 | 190 | 143 |
| | 21.5 | 139 | 105 |
| Aluminum laurate | 3.3 | 140 | 105 |
| | 6.5 | 189 | 142 |
| | 13.0 | 181 | 136 |
| Stearic acid | 2.9 | 132 | 99 |
| | 5.9 | 137 | 103 |
| | 11.8 | 128 | 96 |
| | 17.7 | 112 | 84 |

As can be seen from the above table, addition of aluminum monostearate or aluminum laurate to the culture medium drastically increased the yield of *Lyophyllum ulmarium* (M-8171 strain, FERM BP-1415).

Furthermore, addition of stearic acid brought no increase in the yield, and this indicates that the effect of aluminum stearate is caused by the aluminum atom involved.

EXAMPLE 10

To an intimate mixture of 50 g broad-leaved tree's sawdust (*Fagus crenata*), 50 g coniferous tree's sawdust (*Cryptomeria japonica*) and 100 g rice bran, was added 0, 0.56, 1.2, 3.5, 5.8, 11.7, 17.5 or 25 g of aluminum trisilicate Extra pure reagent; Nakarai Chemicals Co., Ltd.), or 4.0, 10.0, 18.0 or 25 g of aluminum nonasilicate (Kyowaad-700 ®; product of Kyowa Chemical Industry Co., Ltd.), and water was further added in such an amount that the final water content will be 63%. Each of the culture media thus obtained was pressed into a wide-mouthed, plastic bottle (850 ml), a hole about 1 cm in diameter was bored at the center of the pressed medium, and the bottle was stoppered with a cap and autoclaved at 120° C. for 90 minutes. After cooling, spawn of *Lyophyllum ulmarium* (M-8171 strain, FERM BP-1415) was inoculated in the usual way and cultivated in the dark at 25° C. and 55% R.H. for 30 days (the step of allowing mycelium to cover the surface of the sawdust medium), and cultivation was further continued for an additional 30 days. After removing the cap, the culture medium was turned up to a depth of about 1 cm to comb out its surface layer with mycelium (a process to promote the formation of fruiting bodies), and the remaining medium was sprinkled with 20 ml tap water. After standing for four hours, the water left unabsorbed on the surface of the medium was removed, cultivation was continued at a temperature of 15° C., a relative humidity of 95% and a luminous intensity of 20 lux for ten days to form primordia of fruiting bodies. The luminous intensity was then raised to a level of 200 lux, and cultivation was continued for 15 days, thereby examining the effects of aluminum trisilicate and aluminum nonasilicate upon the yield of fruiting bodies. The result obtained is summarized in Table 10.

TABLE 10

| Type of compound added | Amount added (g) | Yield of fruiting bodies (g) | Rate of increase in yield (%) |
| --- | --- | --- | --- |
| Aluminum trisilicate | 0 | 118 | 100 |
| | 0.56 | 159 | 135 |
| | 1.2 | 160 | 136 |
| | 3.5 | 162 | 137 |
| | 5.8 | 167 | 142 |
| | 11.7 | 177 | 150 |
| | 17.5 | 175 | 148 |
| | 25.0 | 139 | 118 |
| Aluminum nonasilicate | 4.0 | 128 | 108 |
| | 10.0 | 141 | 119 |
| | 18.0 | 146 | 124 |
| | 25.0 | 153 | 130 |

As can be seen from the above table, addition of aluminum trisilicate or aluminum nonasilicate to the culture medium drastically increased the yield of *Lyophyllum ulmariuim* (M-8171 strain, FERM BP-1415 ).

EXAMPLE 11

To an intimate mixture of 50 g broad-leaved tree's sawdust (*Fagus crenata*), 50 g coniferous tree's sawdust (*Cryptomeria japonica*)and 100 g rice bran, was added 0, 1, 3, 5, 7 or 13 g of synthetic hydrotalcite (Kyowaad-1000®; product of Kyowa Chemical Industry Co., Ltd.), and water was further added in such an amount that the final water content will be 63%. Each of the culture media thus obtained was pressed into a wide-mouthed, plastic bottle (850 ml), a hole about 1 cm in diameter was bored at the center of the pressed medium, and the bottle was stoppered with a cap and autoclaved at 120° C. for 90 minutes. After cooling, spawn of Lyophyllum ulmarium (M-8171 strain, FERM BP-1415 ) was inoculated in the usual way and cultivated in the dark at 25° C. and 55% R.H. for 30 days (the step of allowing mycelium to cover the surface of the sawdust medium), and cultivation was further continued for an additional 30 days. After removing the cap, the culture medium was turned up to a depth of about 1 cm to comb out its surface layer with mycelium (a process to promote the formation of fruiting bodies), and the remaining medium was sprinkled with 20 ml tap water. After standing for four hours, the water left unabsorbed on the surface of the medium was removed, cultivation was continued at a temperature of 15° C., a relative humidity of 95% and a luminous intensity of 20 lux for ten days to form primordia of fruiting bodies. The luminous intensity was then raised to a level of 200 lux, and cultivation was continued for 15 days, thereby examining the effect of synthetic hydrotalcite upon the yield of fruiting bodies. The result obtained is summarized in Table 11.

TABLE 11

| Amt. of synthetic hydrotalcite added (g) | Yield of fruit-ing bodies (G) | Rate of increase in yield (%) |
|---|---|---|
| 0 | 132 | 100 |
| 1 | 138 | 105 |
| 3 | 164 | 124 |
| 5 | 161 | 122 |
| 7 | 153 | 116 |
| 13 | 135 | 102 |

As can be seen from the above table, addition of synthetic hydrotalcite to the culture medium drastically increased the yield of Lyophyllum ulmarium (M-8171 strain, FERM BP-1415).

EXAMPLE 12

To an intimate mixture of 50 g broad-leaved tree's sawdust (Fagus crenata), 50 g coniferous tree's sawdust (Cryptomeria japonica) and 100 g rice bran, was added 0, 0.1, 0.3, 0.5, 0.8, 1.0, 3.0, 5.0 or 10.0 g of aluminum powder (Chemical pure reagent; Nakarai Chemicals Co., Ltd.), and water was further added in such an amount that the final water content will be 63%. Each of the culture media thus obtained was pressed into a wide-mouthed, plastic bottle (850 ml), a hole about 1 cm in diameter was bored at the center of the pressed medium, and the bottle was stoppered with a cap and autoclaved at 120° C. for 90 minutes. After cooling, spawn of Lyophyllum ulmarium (M-8171 strain, FERM BP-1416) was inoculated in the usual way and cultivated in the dark at 25° C. and 55% R.H. for 30 days (the step of allowing mycelium to cover the surface of the sawdust medium), and cultivation was further continued for an additional 30 days. After removing the cap, the culture medium was turned up to a depth of about 1 cm to comb out its surface layer with mycelium (a process to promote the formation of fruiting bodies), and the remaining medium was sprinkled with 20 ml tap water. After standing for four hours, the water left unabsorbed on the surface of the medium was removed, cultivation was continued at a temperature of 15° C., a relative humidity of 95% and a luminous intensity of 20 lux for ten days to form primordia of fruiting bodies. The luminous intensity was then raised to a level of 200 lux, and cultivation was continued for 15 days, thereby examining the effect of aluminum powder upon the yield of fruiting bodies. The result obtained is summarized in Table 12.

TABLE 12

| Amt. of aluminum powder added (g) | Yield of fruit-ing bodies (G) | Rate of increase in yield (%) |
|---|---|---|
| 0 | 124 | 100 |
| 0.1 | 128 | 103 |
| 0.3 | 139 | 112 |
| 0.5 | 145 | 117 |
| 0.8 | 155 | 125 |
| 1.0 | 155 | 125 |
| 3.0 | 186 | 150 |
| 5.0 | 133 | 107 |
| 10.0 | 129 | 104 |

As can be seen from the above table, addition of aluminum powder to the culture medium drastically increased the yield of Lyophyllum ulmarium (M-8171 strain, FERM BP-1415).

Effects Achieved by the Invention

As is apparent from the foregoing, mushrooms can be cultivated with high yields by the method of this invention.

What is claimed is:

1. A method of cultivating mushrooms which comprises conducting the cultivation in a culture medium containing at least one member selected from the group consisting of magnesium aluminometasilicate, magnesium aluminate, sodium aluminosilicate, sodium aluminate, calcium aluminosilicate, barium aluminosilicate, and synthetic hydrotalcites.

* * * * *